United States Patent
Achilles et al.

(10) Patent No.: US 7,512,831 B2
(45) Date of Patent: Mar. 31, 2009

(54) DEVICE AND METHOD FOR SUPPORTING ERROR CORRECTION IN AN INFORMATION PROCESSING SYSTEM

(75) Inventors: Bernhard Achilles, Erlangen (DE); Jan Sankowski, Nürnberg (DE); Christoph Stade, Erlangen-Bruck (DE)

(73) Assignee: Siemens Aktiengesellschaft, Munich (DE)

( * ) Notice: Subject to any disclaimer, the term of this patent is extended or adjusted under 35 U.S.C. 154(b) by 386 days.

(21) Appl. No.: 11/272,608

(22) Filed: Nov. 14, 2005

(65) Prior Publication Data

US 2006/0142996 A1    Jun. 29, 2006

(30) Foreign Application Priority Data

Nov. 15, 2004    (DE) .................. 10 2004 055 010

(51) Int. Cl.
*G06F 11/00* (2006.01)
(52) U.S. Cl. .......................................... 714/4
(58) Field of Classification Search ............ 714/4
See application file for complete search history.

(56) References Cited

U.S. PATENT DOCUMENTS

| | | | |
|---|---|---|---|
| 5,107,500 A | | 4/1992 | Wakamoto et al. |
| 5,239,547 A | | 8/1993 | Tomiyama et al. |
| 5,367,667 A | * | 11/1994 | Wahlquist et al. ............. 714/32 |
| 6,357,017 B1 | * | 3/2002 | Bereiter et al. ............... 714/27 |
| 6,539,499 B1 | * | 3/2003 | Stedman et al. .............. 714/40 |
| 6,697,962 B1 | * | 2/2004 | McCrory et al. ............. 714/27 |
| 2002/0174380 A1 | * | 11/2002 | Mannarsamy ................ 714/25 |
| 2003/0110413 A1 | * | 6/2003 | Bernklau-Halvor ......... 714/25 |

FOREIGN PATENT DOCUMENTS

DE    101 63 469 A1    3/2003

* cited by examiner

*Primary Examiner*—Bryce P Bonzo
(74) *Attorney, Agent, or Firm*—Schiff Hardin LLP

(57) ABSTRACT

In a device and method for supporting error correction in an information processing system, a data acquisition device acquires damage information pertaining to the information processing system. A data storage contains information about possible damage cases in the information processing system as well as possible countermeasures. A computer linked with the data acquisition device as well as with the data storage, the computer being designed (in terms of programming) to generate a damage-specific questions and actions catalog. An output unit displays the questions and actions catalog.

12 Claims, 3 Drawing Sheets

DEVICE AND METHOD FOR SUPPORTING ERROR CORRECTION IN AN INFORMATION PROCESSING SYSTEM

BACKGROUND OF THE INVENTION

1. Field of the Invention

The present invention concerns a device as well as a method for supporting error correction in an information processing system, in particular a medical information system.

2. Description of the Prior Art

Medical information systems that are commercially available under the designations PACS (image archiving and communication system) and RIS (radiological information system) are, for example, known from DE 101 63 469 A1.

In hospitals, data are increasingly networked with information processing systems such as PACS and RIS. Typically trained personnel of the hospital are primarily responsible for the support of the information processing system. Given technical problems, the responsible personnel can contact external service centers, in particular the vendors of the information processing system. Telephone advice is normally obtained, and calibration and communication problems between the personnel of the hospital and the external service personnel cannot always be avoided. In many cases, a problem already exists for the hospital personnel to accurately describe the fault that occurred in the information processing system. Under such initial conditions, it is very time-intensive to find the cause of the fault and to remedy the fault. A further practical problem is to find the correct contact person at the external service organization.

SUMMARY OF THE INVENTION

An object of the present invention is to provide a time-saving system for supporting error correction in an information system, in particular in the medical field.

The above object is achieved in accordance with the present invention by a method and device for supporting error correction in an information processing system, wherein a data acquisition device acquires damage information pertaining to the information processing system, and wherein information characterizing possible damage situations, as well as possible counter measures therefor, is stored in a memory. A computer is in communication with the data acquisition device and has access to the memory, and the computer generates a damage-specific questions and actions catalog based on the damage information detected by the data acquisition device and the contents of the memory. The computer provides the questions and actions catalog as an output in visual form at a display screen of a display connected to the computer.

A data acquisition device, for example a keyboard of a computer, is provided to acquire damage information, i.e. information concerning an error in the information processing system. The damage information entered by the user, typically an employee of a hospital responsible for the support of the parameter set, is provided to a computer. The computer conducts a comparison with information contained in a data storage about possible damage cases concerning the information processing system as well as possible counter-measures to correct the damage cases. The computer is designed (in terms of programming) to generate a damage-specific questions and actions catalog from the link of the detected damage information with the information contained in the data storage, the catalog being displayed by means of an output unit, for example a screen. The questions and responses catalog contains questions to be answered by the user as needed and/or suggested actions to be implemented by the user to detect states or to correct errors of the information processing system. The questions and actions catalog is thus configured online dependent on the specifications of the information processing system, the discovered problems and the input responses of the user.

The damage-specific generation of the questions and actions catalog means that only such questions or actions that are relevant with regard to the established damage are automatically posed or suggested to the user. An automatic evaluation of individual items of information regarding the damage case established by the user already ensues during the detection of the damage information by the device, in particular in the time intervals between the entries of various individual information items. An electronic manual is therewith provided to the user that guides the user to damage correction without superfluous steps in the fastest-possible and simple manner, and thus offers a particularly effective device service online. The questions and actions catalog can be automatically changed at any time dependent on the response to the generated questions. The level of detail with which the automatically generated questions or indicators or instructions are formulated can optionally be predetermined by the user.

In an embodiment, an evaluation module linked with the computer or integrated into the computer is provided to interrogate the state of the information processing system, and thus is suited to automatically handle at least a portion of the questions of the questions and actions catalog. The questions answered by the evaluation module (also designated as software) can be displayed to the user in the questions and actions catalog in order to provide information about the state of the information processing system. It is alternatively possible to bar automatically answered questions from the display or to merely output a short notice (for example a status message) in order to increase the clarity of the questions and actions catalog.

The features of the system described above to support error correction in an information processing system, in the simplest case, can be completely realized at a single workstation. Contacting external personnel is not absolutely necessary for usage of the system in this embodiment. In many (in particular simpler) damage cases, the automatic generation (dependent on the damage case) of a questions and actions catalog thus saves the time-consuming and costly use of external expertise.

In a preferred embodiment, the inventive system can be employed both by the user of the information processing system alone and with additional external support. A number of data acquisition devices and output units then are present that are appropriately linked via a network, in particular the Internet. A particularly efficient possibility to enlist active specialists at various points in the problem correction as needed is achieved via such networked operation of the device (also synonymously designated as a system).

The automatically-generated questions and actions catalog can also be divided into a number of complexity levels. A higher complexity level is activated and displayed to the user only when the questions of the preceding complexity level are completely answered. A connection with an external service center preferably is established at the earliest upon reaching the second level of the questions and actions catalog. If an external service center is contacted, both a data connection (for example over the Internet) and a voice connection (for example over a conventional telephone connection or likewise over the Internet) are preferably established for this purpose.

In another embodiment, the system for supporting error correction in an information processing system furthermore includes a self-test module which is provided to automatically test at least one part of the information processing system. The self-test module preferably becomes functional only upon reaching a higher complexity level, for example upon reaching the third level. While the evaluation module described above is primarily provided for implementation of individual status questions, the self-test module enables complete tests of hardware or software components of the information processing system. Both of these tests or evaluation modules can be combined into an integrated function module. The start of the self-test module ensues either by a user input or automatically upon reaching a specific level. If the self-test module or the function module is divided up a number of individual modules, the activation of various modules can be provided at different complexity levels, with simple queries being initially automatically implemented at lower complexity levels.

DESCRIPTION OF THE PREFERRED EMBODIMENTS

Figure 1:
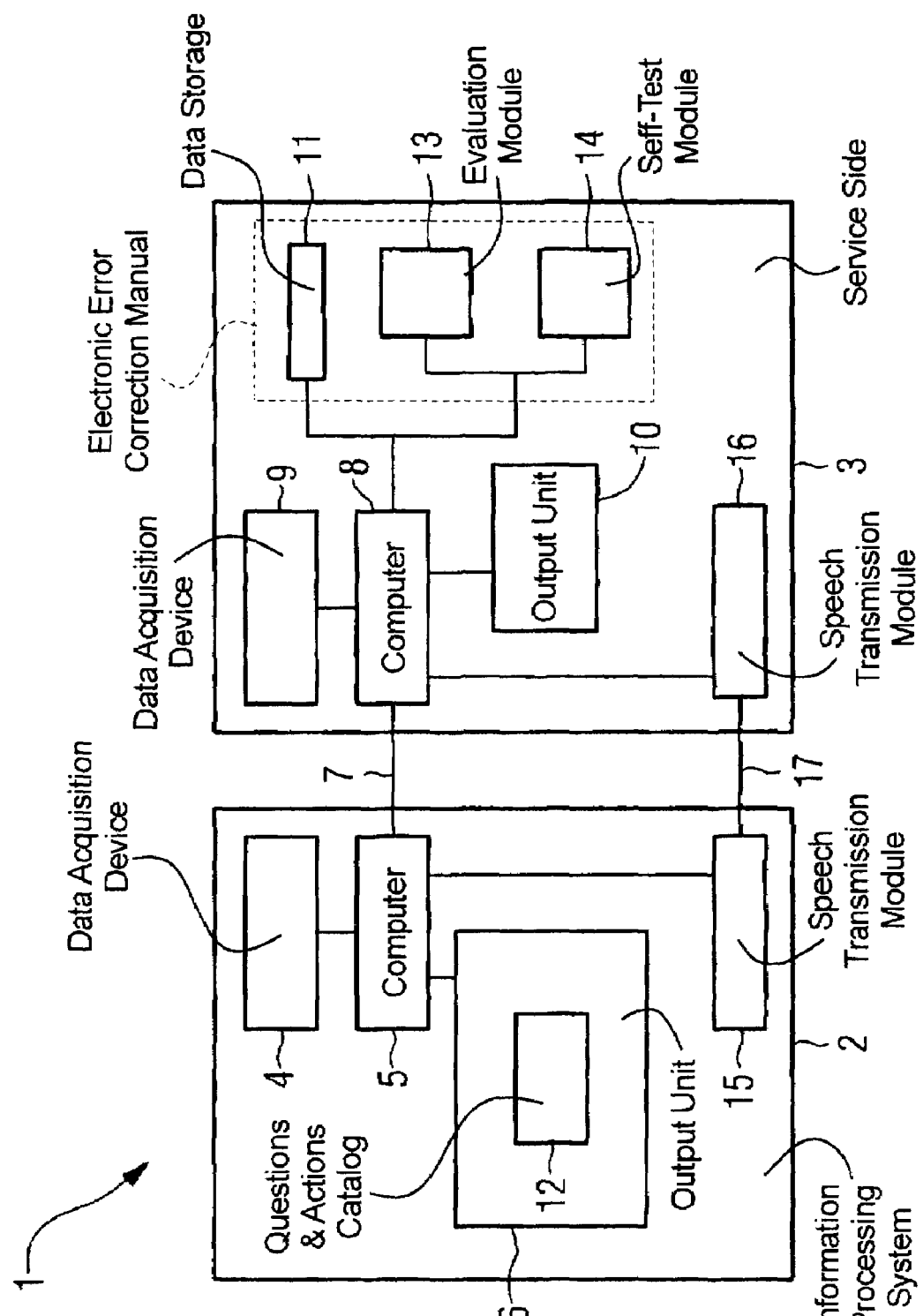
FIG. 1 is a block diagram of a device for supporting error correction in an information processing system in accordance with the invention.

The basic design of a device 1 for supporting error correction in an information processing system 2 is shown in FIG. 1. In this exemplary embodiment, the information processing system 2 forming a part of the device 1 is an information processing system in a hospital, and in particular can be a radiological information system (RIS) and/or an image archiving and communication system (PACS). In general, the information processing system 2 could be composed only of a single device, which need not necessarily exclusively serve for information processing. In typical application cases, however, the information processing system 2 is formed by a number of apparatuses linked with one another. Such apparatuses are, for example, medically-related diagnosis and/or therapy apparatuses as well as data processing devices. In the exemplary embodiment, among other things, components of the same information processing system 2 are used for error diagnostics and correction in the information processing system 2. As described in detail in the following, this has the advantage that the error diagnostics can be automated at least in part; but this requires a minimum functionality of the information processing system 2. If this is not provided, the apparatus 1 nevertheless can be used when (different from the shown exemplary embodiment) the components required for operation of the device 1 are not simultaneously components of the information processing system 2.

The information processing system 2 typically has a number of components that are spatially separate from one another, for example components linked over a local network, and are located in its entirety on what is known as the client side of the device 1. A service side 3 of the device 1 is connected with the information processing system 2 via a remote data connection, in particular a network (for example the Internet). The service side 3 is located, for example, at the vendor of the radiological information system or the image archiving and communication system, and includes one or more servers networked with one another. Although personnel of the hospital in which this information processing system 2 is installed are typically responsible for the support of the information processing system 2, the service side 3 is normally supported by experts in the field of information technology working in a specialized service organization. In summary, as used herein the term service side 3 means all components of the device 1 that are not located in the information processing system 2.

According to the conventional procedure, the responsible hospital personnel would establish contact with the service personnel of the service when an error appears in the information processing system 2. Even in the case of simpler errors, or merely assumed errors, in the information processing system 2, however, difficulties can already arise from the inability of hospital personnel to precisely verbally describe discovered errors. In order to avoid such difficulties and to unburden both the personnel on the client side and the service personnel, the embodiment of the device 1 (described in detail in the following), provides a data-related linkage between the information processing system 2 and the service side 3.

The starting point is that an error or damage in the information processing system 2 is noted by an operator of this system. The operator enters the corresponding information into the information processing system 2 by means of a data acquisition device 4, for example a conventional keyboard. As explained in detail below, the information input ensues in a manner directed (prompted) by the device 1, sequentially and in logical order. The recorded damage information is forwarded from the data acquisition device 4 to a computer 5 of the information processing system 2. An output unit 6 (for example a screen) is connected to the computer 5. The computer 5 is furthermore linked with a computer 8 on the service side 3 by means of a data connection 7 (for example over the Internet). Instead of the single computers 5, 8 shown at each side, a number of computers are preferably present both on the client side (i.e. on the side of the information processing system 2) and on the service side 3. The computer 8 of the service side 3 is connected in a typical manner with a data acquisition device 9, an output unit 10 and a data storage 11. A data storage on the client side is not shown in FIG. 1, but it can likewise be present and take on arbitrary functions of the data storage 11 on the service side 3. However, advantages of a central data administration can be achieved with the arrangement of the data storage 11 on the service side 3, in particular in cases in which a number of information processing systems 2 can be linked with the service side 3.

The data storage 11 contains both information regarding possible damage cases in the information processing system 2 and information regarding suitable countermeasures. The term damage is used herein in a very broad sense and encompasses non-conventional operating states of the information processing system 2 that are caused by malfunctioning. Likewise encompassed within this term are conventional operating states that are not handled by the user of the information processing system 2. If damage information is communicated to the computer 8 via the data connection 7 (whereby a protocol suitable for the data transmission technology (for example an Internet connection) is used), an evaluation of the damage incident is automatically conducted using the information contained in the data storage 11.

The automatic evaluation of the input information concerning the damage case initially serves to further isolate the problem discovered in the information processing system 2 by the operator. For this purpose, the computer 8 in cooperation with the data storage 11 generates a questions and actions catalog 12 (designated as a questionnaire for short) that is displayed to the user by means of the output unit 6. Alternatively, the software assembling the questions and actions catalog 12 and offering electronic online help can also be installed on the client side, i.e. it can form a part of the information processing system 2 within the device 1.

In each case, the generation of the questionnaire 12 is initiated solely by the operator of the information processing system 2. An online manual 18, which can be used without involving of external service personnel, is thus provided to the operator. A further easing of the error correction in the information processing system 2 is achieved by an evaluation module 13 as well as a self-test module 14. The evaluation module 13 has function of interrogating individual states of the information processing system 2, in particular status messages such as "application started" or "application stopped". The evaluation module 13 in particular serves to determine the termination of an application in the information processing system 2 due to an error. For this purpose, for example, a log file (contains the automatically-generated protocol of all or specific actions of one or more users on the computer) is read out. By means of the evaluation module 13, the device 1 is able to automatically answer individual questions of the questions and actions catalog 12. The evaluation module 13 is preferably realized as software, by software routines are installed on the client side (i.e. in the information processing system 2) when the questions and actions catalog 12 is generated or processed.

The responses to questions of the questions and actions catalog 12 that are determined using the evaluation module 13 can be displayed to the user by means of the output unit 6. Alternatively, in the case of a question handled automatically using the evaluation module 13, it is possible to automatically change the questions and actions catalog 12 by omitting the appertaining question. In general, after each user input it is automatically checked whether the questions and actions catalog 12 needs to be adapted. At all times the questions and actions catalog 12 has a contact such that unnecessary questions and answers are avoided. The questions and actions catalog 12 is designed such that the user has an overview of the implemented actions and determinations that are made.

The self-test module 14 provided in addition to the evaluation module 13 has the task of not only interrogating individual states but also of automatically testing complete functions in the information processing system 2. Deviating from the schematic representation according to FIG. 1, the evaluation module 13 and the self-test module 14 can also be combined into a single module that can be entirely or partially installed on the side of the information processing system 2. In addition to information contained in the data storage 11, the modules 13, 14 form parts of the electronic manual 18 that supports the error correction in the information processing system 2.

In order to be able to establish a telephone connection between the operator of the information processing system 2 and the personnel supervising the service side 3 when needed in the simplest manner, speech transmission modules 15, 16 linked with the respective computer 5, 6 are optionally provided. These establish a speech connection 17 (which preferably can be operated by means of the data acquisition devices 4, 9) as needed, for example via a conventional telephone connection or, like the data connection 7, in particular over a network (for example the Internet) between the client side and the service side 3 of the device 1.

The components of the device 1 on the service side 3 can be designed in terms of programming such that the same questions and actions catalog 12 that is also displayed on the client side (namely on the output unit 6) is displayed to the service technician on the output unit 10. The questions of the questions and actions catalog 12 that are automatically generated by means of the electronic manual 18, insofar as they are not handled via use of the evaluation module 13 and/or of the self-test module 14 themselves, thus can be answered either by the operator of the information processing system 2 or by the service personnel. If a number of service technicians from various sites have access (for example over Internet connections) to the service side 3, a processing of the questions and actions catalog 12 is possible from each of the participating locations.

An example case of a usage of the device according to FIG. 1 is explained in the following using FIG. 2:

In a first step S1, by means of the data acquisition device 4 the operator of the information processing system 2 calls up the manual 18 stored in the data storage 11 (if applicable also in further components of the service side 3 of the device 1) for the error case. With the aid of the manual 18, the device 1 generates the questions and actions catalog 12 and thereby directs the operator through a number of complexity levels L1, L2, L3. In the first, simplest complexity level L1, possible elementary error cases are initially queried. In detail, for example, it is asked whether all cables are connected, whether the assumed defective apparatus within the information processing system 2 is activated, whether mains voltage is present or whether the operating display displays "on". To make the error diagnosis easier in this first level L1, a sketch with the correct cable hook-up is displayed on the output unit 6 insofar as this is appropriate.

The request to check the actual cable hook-up in the information processing system 2 is simultaneously addressed to the operator via plain text. The operator has to enter the result of his check in the questionnaire. The response is in turn automatically evaluated using the manual 18. Further questions are posed to the operator dependent on the evaluation. This procedure is iterated until the error in the information processing system is identified 2 and can be corrected or until all questions of the first level L1 have been processed. An automatic switching to the next-highest level L2 ensues only in the last-cited case. For example, basic apparatus settings are checked in this level L2 dependent on the type of the information processing system 2. Individual points of this testing can, for example, be the questions as to whether a monitor brightness is correctly set or whether a standby-mode is activated. As in the preceding level L1, the processing of the individual questions ensues successively and in a logical order predetermined by the manual 18.

Figure 2:
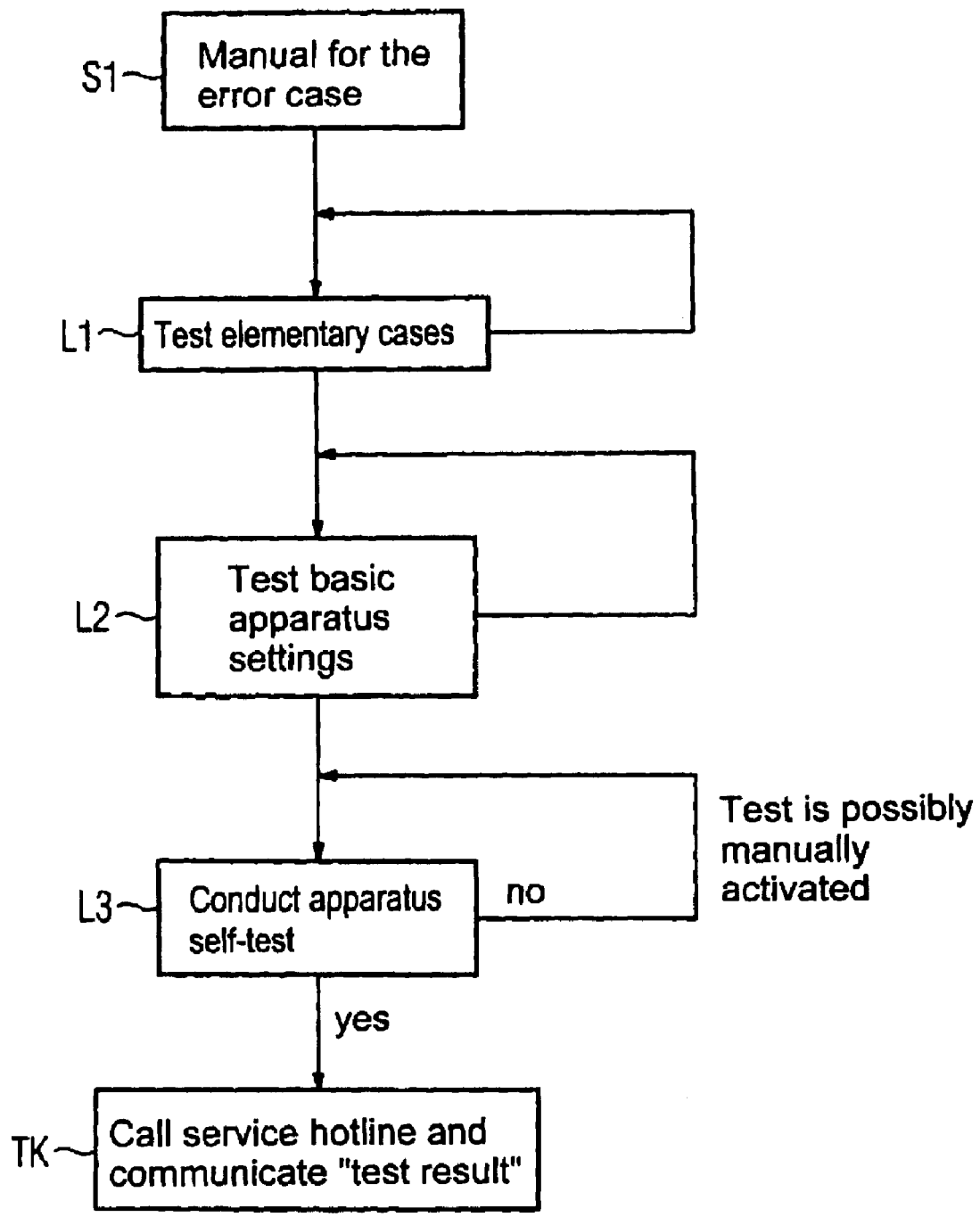
FIG. 2 is a flowchart illustrating the processing of a questions and actions catalog generated in accordance with the invention in a device according to FIG. 1.

The third complexity level L3 is provided in the exemplary embodiment according to FIG. 2 in order to conduct an apparatus self-test in the information processing system 2 or at least its assumed defective components. The switch from the second level L2 to the third level L3 ensues either automatically, insofar as no solution to the discovered problem in the information processing system 2 was found in level L2, or after clearance by the operator. The start of the self-test program in level L3 can likewise ensue either automatically or only after manual activation. The self-test program uses what is known as an agent software or a comparable software product stored either in the information processing system 2 or on the service side 3 (in any case in one of more parts of the device 1) in order to automatically determine the status of applications and/or components of the information processing system 2. For example, an access possibility to a user profile, a log file of an application or a task manager exists. In this manner the self-test program activated in level L3 is in particular in the position to obtain information as to whether a specific application is running in the information processing system 2, has been stopped or has been terminated due to an error. If applicable the error can be identified exactly. The self-test program running using the manual 18 is furthermore in the position to find possible solutions to the discovered problems. Such a solution, for example, can be an update of a configuration or in the cancellation of an un-ended process. On the basis of the self-test, dependent on the type of the occurred problem, the solution in question as well as possible settings that can be effected by the user a suitable measure can either be automatically effected or proposed to the user. In the last-cited case, the measure proposed for solution of the problem is incorporated into and displayed in the questions and actions catalog 12. In individual cases it can also be appropriate to display alternative measures to the user. If applicable, the advantages and disadvantages of the different measures are shown in the questions and actions catalog 12.

In a large part of all error cases occurring in the information processing system 2, a problem correction is at the latest possible in the complexity level L3. Up to this level L3 a contacting of external service experts by the operator of the information processing system 2 is not provided. Only in cases in which no solution of the occurred problem has also been found in level L3, it is provided in a further step TK that the operator if the information processing system 2 establishes a telephone connection (for example by means of the speech transmission modules 15, 16) with external service personnel that, for their part, have access on the service side 3 of the device 1 to support the error correction in the information processing system 2. The service personnel in particular have access to all information input by the client (meaning by the user of the information processing system 2) via the data acquisition device 4. Data of the process as well as results of the self-test of parts of the device 1 conducted in level L3 can likewise be displayed to the service personnel by means of the output unit 10.

Particularly in cases in which the self-test has not led to a problem solution, the appertaining data are archived (for example in the data storage 11) in order to make them accessible to future evaluations. The manual 18 can be continuously updated and expanded in this manner. Tested (proven) measures for correction of occurred malfunctions are thus always suggested to the user of the information processing system 2. Deviating from the exemplary embodiment according to FIG. 2, an implementation of a self-test in the individual case can also already be provided in one of the lower complexity levels L1, L2.

Figure 3:
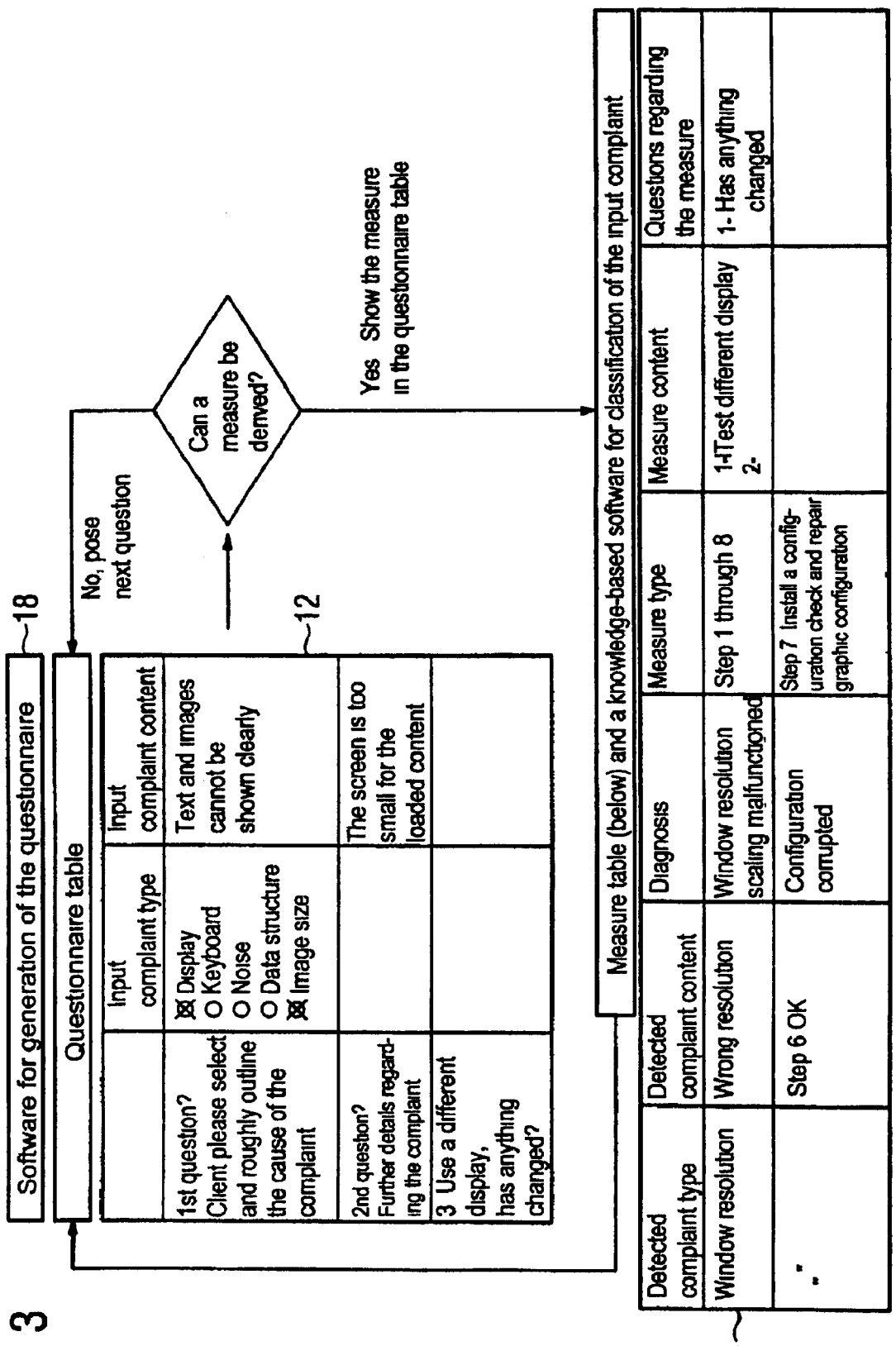
FIG. 3 shows, in sections, a questions and actions catalog as well as components interacting therewith in a device according to FIG. 1.

FIG. 3 shows an excerpt from a possible questions and actions catalog 12 in cooperation with further components of the device 1 serving as a system for supporting the error correction via an online service. Software for generation of the questions and actions catalog 12 is stored in the data storage 11 or an arbitrary other storage of the device 1. Given recall of the electronic manual 18 for the error case, the instruction, "client please select and roughly outline the cause of the complaint" is initially provided to the client, i.e. to the operator of the information processing system 2. Among other things the client can also, for example, select via checking (by means of the keyboard 4) under the following complaint types: display, keyboard, noise, data structure, image size. In the exemplary embodiment according to FIG. 3, the complaint (i.e. the error of the information processing system 2 determined by the client) refers to a display as well as to the image size. The complaint content is to be input by the client in a further field of the questions and actions catalog 12 designed in table form. In the exemplary embodiment, the following has been input: "Text and images cannot be clearly displayed".

The recorded complaint content is now fed to the computer 8 that accordingly analyzes the following question with the assistance of all relevant data contained in the data storage 1 as well as, if applicable, further data storages networked, for example, over the Internet: "Can an action be derived?" If this is the case, an action deemed as suitable according to the manual 18 is automatically shown in the questions and actions catalog 12. Otherwise the next question is posed to the user according to the requirements of the manual 18, i.e. shown in the questions and actions catalog 12. In the shown simplified exemplary embodiment, only the text "further details regarding the complaint" is displayed to the user. The user thereupon inputs the text "the screen is too small for the loaded content". This user input is in turn evaluated by means of the computer 8. As a result of the evaluation, in the exemplary embodiment the following measure combined with a question is selected from a measures table 19 that is part of the manual 18: "Use a different display; has anything changed?" In a manner not shown, the user has to implement the displayed instruction and pursue the error correction method directed by the manual 18 until the occurred problem is corrected.

The measures table 19 uses a knowledge-based software for classification of the input complaints and includes the following columns:
1. Detected complaint type
2. Detected complaint input
3. Diagnosis
4. Measure type
5. Measure content
6. Question regarding to measure The specifications regarding "Detected complaint type" and "Detected complaint content" are to be made by the user; the fields in the further columns are automatically filled. The contents in the columns "Measure content" and "Questions regarding the measure" are displayed to the user in the questions and actions catalog 12; the display of further entries of the measures table 19 is normally not provided. The entries in the measures table 19 can be viewed at any time given corresponding authorization.

The generation and processing of the questions and actions catalog 12 using the manual 18, in particular of the measures table 19, can be combined (in a manner not shown) at any time with the process of the self-test program (FIG. 2, level L3). This also applies for the exemplary embodiment according to FIG. 3 that concerns the second complexity level L2 (test basic settings). As soon as a faulty component or a fault application (in the exemplary embodiment an automatic scaling) is identified, a suitable self-test that determines the status of the appertaining component or, respectively, application is initiated by the software for generation of the questionnaire 12 (meaning a part of the electronic manual 18). The software for generation of the interactive questionnaire 12 (designated as a template generator) hereby installs special agents that, depending on the application case, evaluate contents of the log file or search for clues left behind in the system check, for example. The data detected by means of the self test are archived just like the data input by the user (namely the error messages input in a number of steps and, if applicable, further determinations) in order to be able to optimize the error search supported by the manual 18 in future cases.

For particularly rational optimization of the method implemented by means of the device 1, what is known as a mining software is used that enters the connections gained from every error case into the electronic manual 18, in particular into the measures table 19. The efficiency of the device 1 can thus be continuously improved in the course of the service life. A particular advantage of the device 1 is also that its efficiency can be objectively measured in that expenditure and duration of an error correction is detected and the content of a recorded complaint (i.e. the complaint message) as well as the implemented measures is evaluated. In comparison with a conventional online service, a significant savings potential is therewith provided both on the client side and on the part of the service provider. Involvement of the last-cited location in the error correction in the information processing system 2 is in particular only necessary in a portion of the cases, whereby the savings effect is more pronounced the more that a lower complexity level is applied in the error case.

Although modifications and changes may be suggested by those skilled in the art, it is the intention of the inventors to embody within the patent warranted hereon all changes and modifications as reasonably and properly come within the scope of their contribution to the art.

We claim as our invention:

1. A device for supporting error correction in an information processing system, comprising:
   a data acquisition device that acquires damage information pertaining to operation of an information processing system;
   a memory containing first information characterizing possible damage situations for said information processing system and second information characterizing possible counter measures for said damage situations;
   a computer in communication with said data acquisition device and having access to said memory, said computer being programmed to generate a catalog with damage-specific questions and actions ranked hierarchically therein according to complexity dependent on said damage information acquired by said data acquisition device and said first information and said second information stored in said memory; and
   an output unit connected to the computer at which said computer causes said damage-specific questions and actions in said catalog to be visually displayed in said hierarchical ranking.

2. A device as claimed in claim 1 comprising an evaluation module that interrogates a state of said information processing system to automatically respond to at least one question in said question and actions catalog.

3. A device as claimed in claim 2 wherein said data acquisition device is a first data acquisition device and wherein said output unit is a first output unit, and comprising a plurality of further data acquisition devices, in addition to said first acquisition device, each of said further data acquisition devices having a further output unit respectively connected thereto.

4. A device as claimed in claim 3 wherein each of said data acquisition devices has a communication link allowing communication via a network among all of said data acquisition devices.

5. A device as claimed in claim 1 comprising a self-test module connected to said computer for automatically initiating testing of at least a portion of said information processing system dependent on said damage-specific questions and actions catalog.

6. A device as claimed in claim 1 wherein said computer is located remote from said information processing system and comprising a speech transmission system allowing speech transmission between the location of said computer and the location of said information processing system.

7. A device as claimed in claim 1 wherein said computer hierarchically ranks said damage-specific questions and actions in said catalog with actions that are non-manually, automatically implementable being lowest ranged and actions requiring manual implementation being highest ranked in terms of complexity.

8. A method for supporting error correction in an information processing system, comprising the steps of:
   acquiring damage information in electronic form pertaining to operation of an information processing system;
   electronically storing first information characterizing possible damage situations for said information processing system and second information characterizing possible counter measures for said damage situations;
   in a computer in communication with said data acquisition device and having access to the stored first and second information, electronically generating a catalog with damage-specific questions and actions ranked hierarchically therein according to complexity dependent on said damage information and said first information and said second information stored in said memory; and
   at an output unit connected to the computer, visually displaying said damage-specific questions and actions in said catalog in said hierarchical ranking.

9. A method as claimed in claim 8 comprising electronically interrogating a state of said information processing system to automatically respond to at least one question in said question and actions catalog.

10. A method as claimed in claim 8 comprising, in a self-test module connected to said computer, automatically initiating testing of at least a portion of said information processing system dependent on said damage-specific questions and actions catalog.

11. A method as claimed in claim 8 wherein said computer is located remote from said information processing system and comprising conducting a speech transmission via a speech transmission system between the location of said computer and the location of said information processing system.

12. A method as claimed in claim 8 comprising, in said computer, ranking said damage-specific questions and actions hierarchically with actions that are non-manually, automatically implemented being ranked lowest and actions requiring manual implementation being ranked highest in terms of complexity.

* * * * *